United States Patent [19]
McHenry et al.

[11] Patent Number: 6,098,829
[45] Date of Patent: Aug. 8, 2000

[54] CAN COMPONENTS HAVING A METAL-PLASTIC-METAL STRUCTURE

[76] Inventors: Robert J. McHenry, 2819 Royal Ashdown Ct., St. Charles, Ill. 60174; Dominique Petit, Les Cotes F-38340, Pommiers-la-Placette, France

[21] Appl. No.: 08/656,343

[22] PCT Filed: Nov. 30, 1994

[86] PCT No.: PCT/US94/13921

§ 371 Date: Aug. 26, 1996

§ 102(e) Date: Aug. 26, 1996

[87] PCT Pub. No.: WO95/15259

PCT Pub. Date: Jun. 8, 1995

[51] Int. Cl.[7] ............................. B65D 25/00; B65D 6/08; B21D 28/00
[52] U.S. Cl. ........................... 220/62.12; 220/62.22; 220/669; 72/338; 72/349; 72/379.4; 72/715
[58] Field of Search ............................. 220/450, 906, 220/62.12, 62.11, 62.22, 669; 428/458, 460, 461, 423.5, 423.7, 424.2, 477.4, 501, 213, 214, 215, 209; 72/338, 349, 379.4, 715

[56] References Cited

U.S. PATENT DOCUMENTS

| 3,721,597 | 3/1973 | Colburn | 156/309 |
|---|---|---|---|
| 4,313,996 | 2/1982 | Newman et al. | 428/215 |
| 4,403,010 | 9/1983 | Festag et al. | 428/200 |
| 4,594,292 | 6/1986 | Nagai et al. | 428/458 |
| 4,671,985 | 6/1987 | Rodrigues et al. | 428/215 |

FOREIGN PATENT DOCUMENTS

| 34781 | 9/1981 | European Pat. Off. . |
|---|---|---|
| 0134958 | 3/1985 | European Pat. Off. . |
| 538774 | 4/1993 | European Pat. Off. . |
| 2103134 | 2/1983 | United Kingdom . |
| 2224238 | 5/1990 | United Kingdom . |
| 79/00297 | 5/1979 | WIPO . |
| 95/15226 | 6/1995 | WIPO . |

*Primary Examiner*—Paul Thibodeau
*Assistant Examiner*—Holly C. Rickman
*Attorney, Agent, or Firm*—Hill & Simpson

[57] ABSTRACT

The invention concerns components of food cans (1), can bodies (6), and ends fabricated starting from a stratified construction constituted by a foil of plastic material on each of the faces of which adheres a metal foil and their fabrication process. The components are characterized by the nature of the material, metal-polymer-metal construction and by the fact that ratio of the plastic thickness to the sum of the metal thicknesses is greater than 0.5. The fabrication process is drawing in one or several passes characterized preferably by the particular shape of the punch and of the die plates. The invention applies equally to the fabrication of food cans as to ends for food cans or for beverage cans.

18 Claims, 3 Drawing Sheets

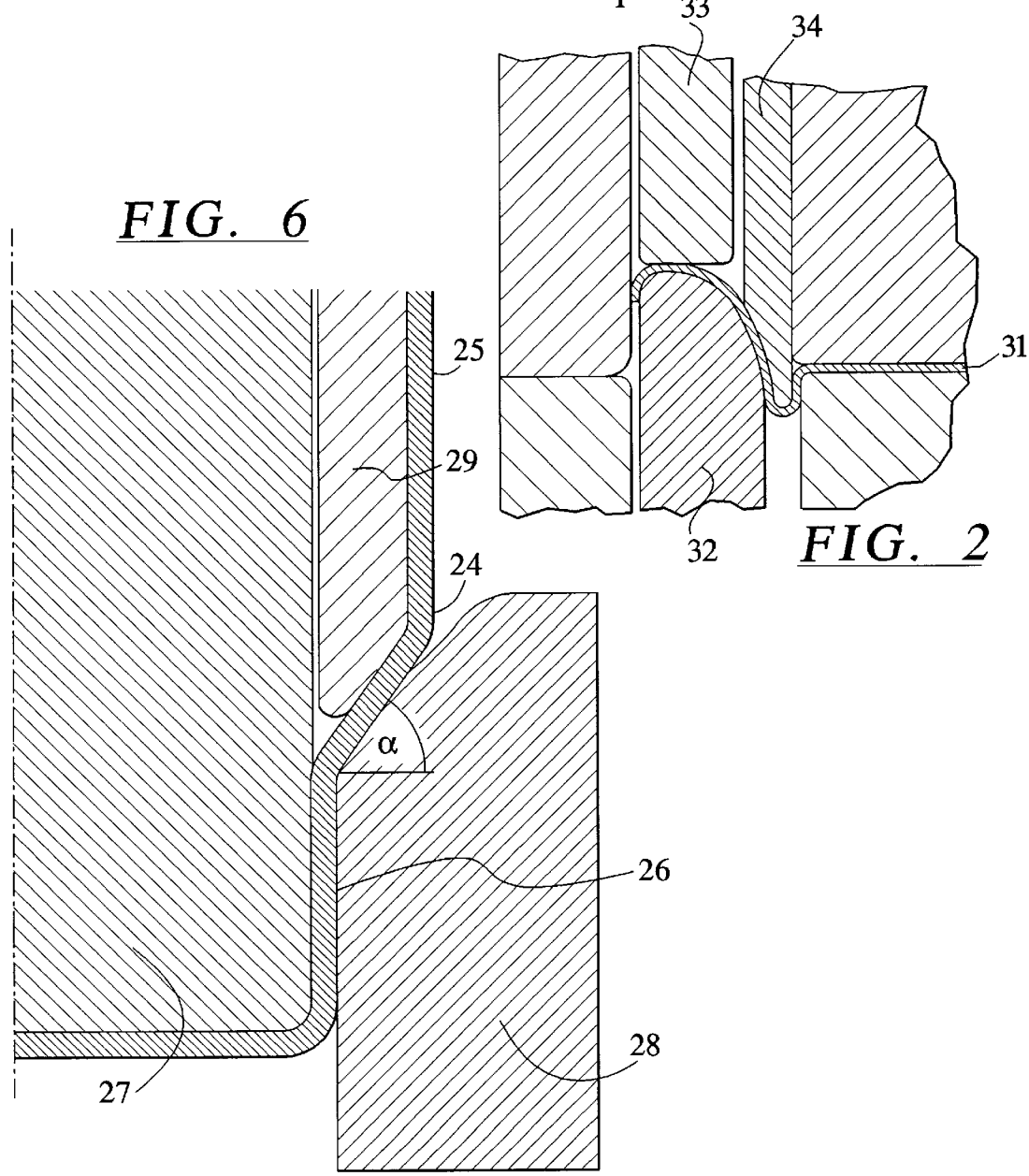

CAN COMPONENTS HAVING A METAL-PLASTIC-METAL STRUCTURE

BACKGROUND OF THE INVENTION

The invention falls in the technical area of the fabrication of components, can bodies and ends, easy-open or not, intended for the packaging of food products by drawing, in one or several passes, starting from a layered metal-plastic construction.

More precisely, the metal-plastic construction used in the present invention is of the type metal-polymer-metal, that is in which a layer of polymer is interposed between two metal sheets to which it is adhered.

In the text of this patent application, we will use without distinction for this concentration the terms metal-plastic-metal, metal-polymer-metal, or more simply in an abbreviated fashion, MPM.

There are numerous documents describing layered metal-plastic constructions. The majority of these concern metal-polymer or poly-metal-polymer constructions, metal-polymer-metal constructions being rarer.

Of those documents which do mention MPM constructions, there is none that teaches what range of materials and thicknesses are suitable for making drawn and ironed beverage or food cans.

By way of illustration one can cite the international PCT application filed on Jun. 25, 1981 by Metal Box Limited and published under the number WO 82/00020 on Jan. 7, 1982. This application has given birth in particular to the European patent EP 055 719.

This patent describes a metal-plastic construction in the simplest form of realization of a polyethylene (called for abbreviation PE) film attached to a foil or plate of metal. Another method of realization consists of two films of PE attached to opposite surfaces of a metal plate to form a complex PE-metal-PE. Finally, a third method of realization consists of two plates or foils of metals attached to opposite surfaces of a PE film. The PE used, obtained by copolymerization under a low pressure of ethylene and of butene-1, is of the type linear low density at a density of between 0.91 and 0.94 and it has been found that this particular type, whose characteristics are described in the application, has the interesting property of adhering directly to the metal without needing to use an adhesive. It suffices to adhere it to the metal by the simultaneous application of heat and pressure (heat sealing).

The metallic substrate can be steel, steel having a coating of tin or of chrome or of chrome/oxide or of zinc, of aluminum treated or not with nickel, copper, or zinc. It can have undergone a chemical conversion treatment.

Although there is no explicit teaching as to the desired absolute or relative examples of simple metal-plastic constructions in which the films of different types of polyethylene of 100 microns thickness are thus heat sealed on the plates of different metals; steel, tin plated steel, steel coated with chrome-chrome oxide, or aluminum of a thickness of 210 microns. The specimens obtained are then formed into hollow articles by folding, stamping, drawing, wall-ironing. The adhesion of the coatings is compared and demonstrates the superiority of linear low density polyethylene.

The French patent FR2 665 887 (Pechiney Emballage Alimemntaire) describes a capsule to fit over a cork made by drawing, drawing and ironing, or flow turning, characterized in that it is comprised of two layers of aluminum bound together by an adhesive layer of shore hardness less than 80. The adhesive layer can be constituted of an ethylene acrylic acid or of polyethylene, or of polypropylene modified with acid functionaltiy. The total thickness of the complex is comprised between 120 and 400 microns with the following percentage distribution of the total thickness:

| Outer layer of aluminum | 20 to 50% |
| --- | --- |
| Adhesive layer | 3 to 30% |
| Inner layer of aluminum | 40 to 60% |

European Patent Application EP-A-0 046 444 assigned to Schwerzerische Aluminum AG describes an MPM composite foil in which the plastic layer could be as thick as the two metal layers combined. One stated requirement for achieving deep drawability is to select the plastic core layer and the metal surface layers such that when the composite is elongated, the load borne by the plastic core is greater than that borne by each of the metal strips. This condition is achieved by use of an oriented or stretched plastic layer. It is also stated that the soft or half-hard aluminum thin strip is particularly well suited. There is no teaching of drawing rigid containers such as cans.

A similar approach to MPM constructions is described in European Patent Application EP-A-O 034 781 which is assigned to BASF Aktiengesellschaft. The inventors of that application roll the plastic film before combining it with the metal foil in order to give the plastic ductility properties which are more like selected metals.

A metal-plastic-metal structural laminate which can be formed into various useful articles is described in European Application EP-A-0134958 assigned to Dow Chemical Company. This invention is in pat defined by a very wide range of thicknesses of the individual layers, of total thicknesses, and of ratio of thicknesses. It is further defined in terms of an ability of the laminate to withstand at least a certain level of stretch formability as measured in a standard laboratory test, the ability to be bent to a given sharp radius without metal rupture, and a certain level of thermal stability.

The patent does not contain any reference to any drawn or drawn and ironed shape nor to the ability of these laminate constructions to be formed by either a drawing process or by a drawing an ironing process. The laboratory test described is a form of biaxial tension test in which the material is uniformly stretched while maintaining the periphery, fixed in such a way as to thin the material. While such a stretch forming process is conventionally used in forming shallow parts such as automotive panels, it is not used for making food or beverage cans. A conventional drawing process such as is used to make food cans or for the initial steps to make beverage cans allows the material to flow from the periphery and results in little or no thickness reduction.

U.S. Pat. No. 3,298,559, assigned to Continental Can Company, describes laminated metal-plastic containers, such as cake pans, which are cold drawn in conventional forming dies. Among the metal-plastic containers described are some which are of the MPM type. Although wide ranges of thicknesses of metal and of plastic are claimed, there is no teaching as to the importance of the ratio of these thicknesses. Those examples which cover MPM constructions have a ratio of plastic to total metal thickness of between 5 and 9. The metal layers in the MPM examples are described as dead-soft or zero temper. There is no indication that such containers can be formed by a drawing and ironing process or that drawn containers suitable for food cans can be made.

Problem Posed

The problems presented to the inventors was that of improving drawn can bodies, in particular food cans, and their easy open ends.

The forming process of these components, cans and ends, is the process of drawing or of drawing-redrawing which permits very high rates of production.

Very schematically, the process includes at least one drawing pass. One starts with a circular or nearly circular flat disc made of steel of aluminum alloy. The disc is then drawn either in a sole pass for giving an end or a can, or in two or several passes of which the first furnishes an intermediate body in the form of a cup which is then redrawn to reduce its diameter and increase its height. This technique is well known to the man skilled in the art.

The cans or easy open ends are coated internally by a food approved varnish and externally by one or several layers of decoration indicating the nature and the brand of the contents.

Among the elements of cost of the cans and ends made by drawing, the cost of the metal, despite its slight weight, constitutes a preponderant portion. The idea had therefore occurred to the researchers of replacing a part of the metal by a less costly material: plastic. The cost of the usual polymers, polyolefins such as polyethylene (PE) or polypropylene (PP), polyesters (PET), polyamides is generally less, for an equal thickness than that of aluminum alloys.

The modulus of elasticity and the elastic limit of most plastic materials being much less than those of metals, the substitution of plastic for metal faces several structural problems. In addition to these structural problems, there are process problems tied to the fact that metal cans are generally fabricated under conditions considerably different from those used for forming plastics. For example, metal containers are normally fabricated at high speed and at ambient or moderate temperatures, whereas the behavior of plastics is such that plastic containers are fabricated normally at lower speed and at higher temperatures.

Previous researchers, in particular as described in WO82/00020, have shown that thin layers of plastic adhering well to a metal foil are able to be formed by simple modifications to the conventional metal forming processes. This can be explained by the fact that the behavior of the metal-plastic construction during forming is controlled by the stronger and thicker metal and by the fact that the stresses generated in the thin plastic layer or layers are easily transferred to the metal foil as a result of their good adherence.

This restriction to relatively thin plastic layers has not been a problem in the previous research because the role of the plastic was in general to protect the metal against corrosion and that a relatively thin layer of plastic suffices for that protection.

Even though WO 82/00020 states that if desired, the laminates may be made with sheet metal or foil bonded to opposed surfaces of the polyethylene film, there is no indication that thicker plastic layers would be desired or possible in such MPM structures. If one construction MPM structures using the 100 micron plastic film and two metal foils of 210 microns which are described in that patent, the ratio of plastic core thickness to total metal thickness would be less than 0.24. This low ratio, as will be shown, is below that required for the desired cost savings.

In addition to the use of layers of plastic which are thin enough to be dominated in forming by the metal, previous investigators have used two approaches. The first which is illustrated in French Patent FR1414475 and U.S. Pat. No. 4,390,489 is to carry out the forming starting from a heated material as would be used in conventional plastics processes such as thermoforming.

The second approach is to work with metal-plastic constructions in which the respective materials are selected in such a way that the plastic core dominates the forming and the aluminum deformation follows the deformation of the plastic. In EP-A-o 046 444 described previously, this condition is specified in terms of the load borne by the plastic core being greater than that borne by each of the metal strips. This is achieved by use of soft or half-hard aluminum strip and the use of an oriented or stretched plastic layer.

In EP-A-0 034 781, the inventors cold roll the plastic film in order to make it even more dominant compared to a given metal foil. This enables them to use a somewhat stronger metal foil. Although the inventors do not state their results in terms of the percentage of load which is borne by the metal, that percentage can easily be calculated for each of the layered constructions shown in the example under the assumption that the ultimate metal stress if equal to that of the metal foil when tested by itself. This calculation shows that the metal would bear only 16.4% of the tensile load in the construction which uses the cold rolled film and 20.8% in the comparison sample using a thicker layer of the same plastic film without cold rolling.

In U.S. Pat. No. 3,298,559, the inventors do not cold roll or otherwise orient the plastic but in each of the MPM examples given, they do specify that the aluminum foils are dead-soft or zero temper. In addition, the ratio of plastic thickness to total metal thickness is at least 5 to 1 in each MPM example. Although the inventors do not state the percentage of load taken by the metal nor provide mechanical data from which it can be calculated, this combination of dead-soft aluminum and high plastic to metal thickness ratio dictates that the plastic layer will dominate the forming process.

As will be shown below, the use of soft metal alloys or of a layer of plastic which is very thin compared to the total metal thickness would not meet the objective of the present inventors in providing a major reduction in material cost for a container which must resist, at some point in time, an internal pressure or other significant mechanical load.

The current inventors have also found that an unoriented plastic core layer is preferred over an oriented plastic core in terms of the ability to withstand the deeper draws required for drawn food cane.

To attain the objective of the present invention which is to reduce the thickness and, therefore, the cost of the metal used, the inventors have found that the plastic layer ought to be placed between two metal layers and ought to be thicker than those attained up until now in the containers made of metal-plastic constructions.

It is known in other types of mechanical structures to use a low cost or low density material as a central layer placed between two outside layers made from a stronger and more rigid material. Such "sandwich" structures are known for achieving a bending resistance approaching that of a single layer of the more solid material of the same thickness as the total thickness of the sandwich.

Even though the less resistant central material contributes to the bending resistance of the structure, it barely contributes to the tensile resistance of the sandwich. This limits the possible reduction of the total thickness of the two external metal layers. The tensile resistance of a structure with relatively thin metal walls such as a container is called membrane strength.

The inventors have found that the pressure at which the base of a rigid container, such as a can or the end, starts to pass from a concave shape, viewed from the exterior, to a convex shape depends on a complex function of the bending resistance and the membrane strength. This pressure is commonly called bottom buckling pressure. The form of this function of the two types of resistance depends on the exact shape of the concave dome and of the shape of the part of the part of base which connects the dome to the bottom of the container's wall.

The bottom buckling pressure (P) can be expressed for single layer metal as a function of the thickness by the formula:

$$P = ke^n$$

with k=proportionality constant depending on the material, e=thickness of the material, n=exponent varying between 1 and 2 depending on the geometry of the base.

When the exponent n is close to 1, this signifies that the buckling pressure is more sensitive to the membrane resistance; when the exponent is close to 2, this signifies that the bottom buckling pressure is more sensitive to the bending resistance. For most beverage can bases, the exponent lies between 1.2 and 1.9.

The closer the exponent is to 2, the less thickness of plastic is required for a given thickness of the external metal layers.

FIG. 3 shows the plastic thickness $e_p$ required for a total thickness of the two metal layers $e_m$ to obtain the same buckling pressure as with an entirely metallic structure with a thickness of 330 microns. As one can observe on the different curves, one needs much less thickness of plastic in the case of an exponent n=1.7 for which the bending resistance is the most critical than in the case of an exponent n=1.2, for which the membrane strength is the most critical.

One can see also on this FIG. 3 that for a given base configuration and, therefore, for a given value of n, there exists a series of plastic thicknesses $e_p$ and corresponding total thickness of the two metal layers $e_m$, which will give the required bottom buckling strength. For a configuration with an exponent of 1.5 for example, all the acceptable combinations correspond to the abscissa and the ordinate of each point of the curve designated 1.5.

In general, the points to the left on each curve represent the most economic structures because they incorporate less of the costly metal and more of the low cost plastic.

One should also note that these points have a ratio of the thickness of the plastic to the total thickness of the metal higher than that which has been realized in the prior art.

It was expected that the fabrication, starting with a MPM structure, of containers with the conventional metal forming processes such as drawing would be relatively more difficult with structures comprised of less metal and more plastic. One reason for this expectation was that, as much during the drawing as the ironing, the MPM structure is submitted to tensile stresses and one would think, according to the existing technology, that the elongation to rupture of the MPM structure would be the same as the of an entirely metal structure. At this elongation, the plastic material, as a result of its low modulus would support a minor portion of the tensile stresses induced by the drawing and ironing. In order to test the commonly accepted assumption of an equal elongation to rupture, the inventors have done uniaxial tensile tests on several structures with varying thickness of plastic and a constant thickness of 100 microns for each layer of the exterior aluminum alloy.

They have been surprised to observe that, as shown in FIG. 4, the elongation to rupture increased with the thickness of the plastic and attained a maximum in the neighborhood of 300 microns of plastic, that is a ratio $P/(M_i+M_e)$ of 1.5.

Although the explanation of this surprising increase in the elongation to rupture is not perfectly clear, the examination of the specimens after rupture shows that it is related to the ability of the plastic to spread the concentration of stresses resulting from the initiation of necking of one of the external metal layers. The plastic distributes the stresses over a large surface of the opposing external layer, thus preventing the necking of the first external layer from propagating to rupture. If the layer of plastic is relatively thin, this concentration of stresses is transferred to a relatively small surface of the opposite external layer which leads to a simultaneous necking of the two layers. If the layer of plastic is thicker than the optimum value, it seems that the plastic is less capable of transferring the stress concentration to the opposite external layer, and the necking proceeds in a sequential fashion in the two metal layers.

The improvement of the toughness of the MPM constructions characterized by their elongation to rupture has permitted successful drawing and ironing MPM structures with relative thicknesses of plastic significantly higher than had ever been achieved. As indicated above, the economic balance for a given bottom buckling pressure is significantly more favorable with such higher thickness of plastic.

Using data from the same tensile specimens as used to produce FIG. 4 in which each metal foil had a thickness of 100 microns and was aluminum alloy 3003 with a tensile rupture strength of 239 $MP_a$, the inventors calculated the portion of the total load which was borne by the metal foil. The percentages varied from 99% with a 55 micron thick core to 82% with a 420 micron thick core.

SUMMARY OF THE INVENTION

The present invention has an objective a process for the fabrication of components of metal cans intended for the packaging of food products by drawing layered metal-plastic compositions of the type MPM of which the nature of the constituents, their thicknesses are themselves adapted to the mechanical characteristics required.

The present invention has equally as objective the can components, bodies or ends, made by drawing starting from these metal-plastic constructions.

BRIEF DESCRIPTION OF THE DRAWINGS

FIG. 1 schematically represents the drawing of a circular disc according to the prior art for forming a cup;

FIG. 2 represents schematically represents the drawing of a circular disc according to the prior art for forming an end;

FIG. 6 represents mold components for the second drawing pass according to the invention.

DESCRIPTION OF THE PREFERRED EMBODIMENTS

Figure 3:
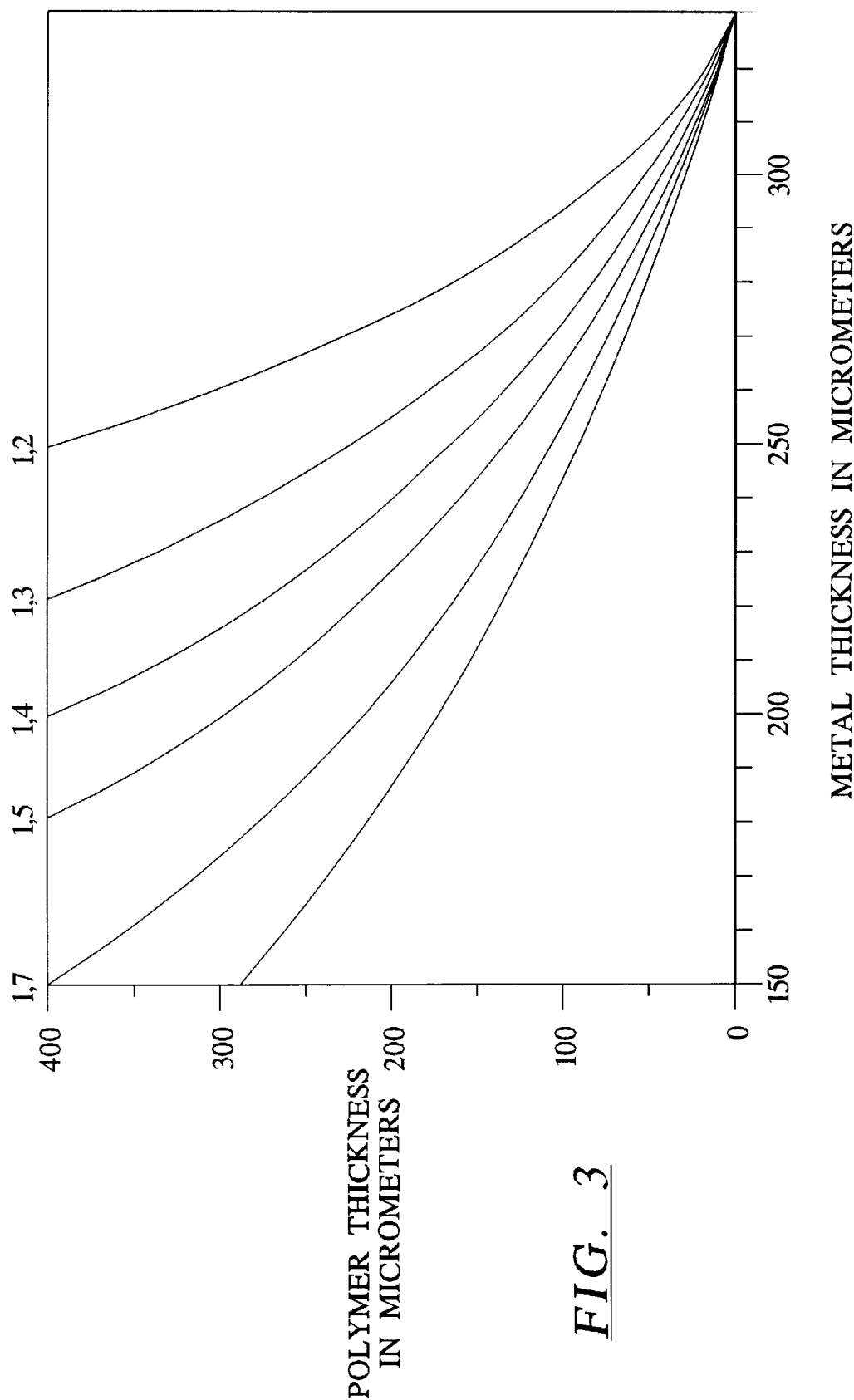
FIG. 3 represents isobars for the bottom buckling pressure P, the total thickness of the metal $e_m$ being the abscissa and the thickness of the intermediate polymer layer $e_p$ being the ordinate.
Figure 4:
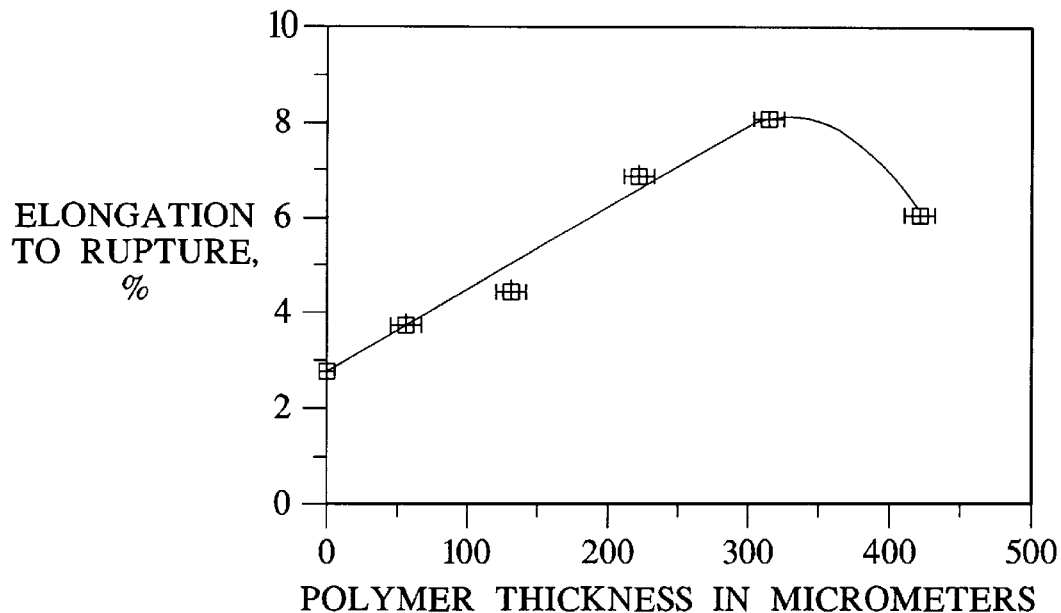
FIG. 4 represents the variation of the elongation to rupture of an MPM construction in which each of the external metal foils has a thickness of 100 microns, as a function of the thickness of the central layer of polymer.

The invention concerns a process of fabrication of drawn can bodies and ends intended in particular for packaging food products characterized in that it includes the following steps:

a) preparation of a strip of metal-plastic construction comprising successively a metal layer, preferably a polymer adhesive layer, a thermoplastic polymer layer, preferably a second of layer of polymer adhesive, a second metal layer, b) cutting circular discs from the strip, c) drawing the discs to give can bodies or ends with the aid of a punch and a die plate.

The layered metal-plastic construction of the type metal-polymer-metal fabricated during Step (a) above is characterized in that it is constituted of a central layer of thermoplastic polymer of thickness P coated on each of its interior and exterior faces with metal foils of respective thicknesses $M_i$ and $M_e$, such that the ratio $P/(M_i+M_e)$ is greater than 0.5.

Following the same line of explanation of the problem developed above, this ratio $P/(M_i+M_e)$ will be preferably between 0.7 and 2.5 and most preferably between 1 and 2.

In an advantageous method of realization of the metal-plastic construction, the central polymer layer has a thickness before ironing between 100 and 500 microns for the can bodies and between 80 and 300 microns for ends. Each of the metal foils has a thickness between 25 and 150 microns for the can bodies and between 25 and 100 microns for the ends. In a further advantageous method, this plastic layer is essentially non-oriented other than incidental orientation normally produced during the casting or blowing of a plastic film.

The polymer constituting the central layer is chosen among one of the following thermoplastics: polypropylene, high and low density polyethylenes, polyesters and polyamides. It is interesting to note that, the polymer not being in contact with the food product or the beverage contained within the container, it is possible and recommended to use recycled polymers. Trials have been made with recycled polyesters and polypropylene and give completely satisfactory results.

The metal is either steel, tin plated or not, coated with chrome, zinc, nickel, or of chrome-chrome oxide, or of aluminum or an alloy of aluminum, aluminum or its alloys being preferred. It is further preferred that the rupture strength of the metal foil when tested alone and in tension be greater than 185 MPa.

The selection of the specific materials and the thicknesses of the layers is preferably such that, when the starting sheet is pulled in uniaxial tension, most of the load is borne by the combined metal layers. More preferably, the percentage of the load which is borne by the combined metal layers should be greater than or equal to 70%.

The metal foils can be of different thicknesses or constituted of different metals. One could, for reasons explained later, use a metal foil corresponding to the exterior of the can thicker than that which corresponds to the interior of the can or choose for the foil corresponding to the interior of the can an alloy having a better corrosion resistance and for the foil corresponding to the exterior of the can an alloy having better mechanical strength.

A layer of appropriate adhesive of a thickness between 1 and 20 microns can be interposed between the central layer of polymer and the foil or foils of metal, the thickness of the adhesive being included in the total thickness of polymer P.

The adhesive interposed between polymer and metal is either a thermoset polymer, for example a polyurethane or an epoxy, or a thermoplastic polymer such as polyolefins modified in a classical fashion by an ethylenic acid (malic, crotonic, etc.) ethylene acrylics (EAA), polyesters or copolymers of the monomers corresponding to the above indicated polymers.

The adherence of the metallic foils to the central polymer layer is evidently an important characteristic of the metal-plastic constructions and of the can bodies produced from these constructions. This adherence is measured by the peel strength, the force necessary for detaching a band of metal foil of determined width from its polymer support and which is expressed, therefore, in force per unit length. The constructions intended for the production of drawn and ironed can bodies ought to have a peel strength higher than 0.2 newtons per millimeter.

The metal-plastic constructions can themselves be coated on one or both sides with a varnish or a polymer film without parting from the framework of the present invention.

Another object of the invention concerns the finished cans prepared starting from the bodies or forms of which the characteristics are indicated above. To fabricate a can starting from a can body, one first proceeds to trim the body to height by shearing the upper part of the walls, then to neck this upper part. The upper edge ought to be then rolled to a small radius of curvature to permit the seaming of the end after filling the can. Because, in the course of this operation of bending the metal-plastic construction according to this small radius, one observes that the metal foil the farther from the center of curvature, that which is in extension, breaks at the point where the radius is the smallest, the other metal foil remaining intact. This phenomenon, for reasons which it would take too long to explain here, does not occur with a homogeneous metal of the same thickness without a polymer layer.

Faced with this problem, the inventors have first of all searched for a solution, then have rapidly set forth the hypothesis that this rupture of the metal foil in extension had no effect on the mechanical strength of the can which had been filled and seamed. What could be feared, in effect, is that a can with a rolled flange in which one of the two metal foils is ruptured would not be able to resist the tensile stresses created by the internal pressure which tends to detach the end. However, the internal stresses in the axial direction of a pressurized cylinder are approximately half of those in the direction perpendicular to the axis. Thus, if there is enough metal in the complete metal-plastic construction, with its two layers of metal, to resist the stresses in a plane perpendicular to the axis, there is enough metal in the remaining intact layer to resist the axial stresses. This hypothesis has been confirmed by calculations. Moreover, the total thickness in the brim is, in general, higher than that of the thinnest part of the wall, which gives a margin of safety. It is also possible for reinforcing the can to choose for the external foil a higher thickness or a stronger alloy than for the internal layer. Finally, the exterior appearance of the can will not be affected since the broken part of the metal foil will be covered by the folded edge of the end in such a way that the final user of the can will not even notice it.

A final can of metal-plastic metal-polymer-metal, possessing an upper rolled border in which the metal foil the greater distance from the center of curvatuve, which is therefore in extension, is ruptured at the location where the radius is the smallest constitutes a second object of the invention.

Besides the technique of seaming, it is equally possible to attach the cover to the metal-plastic can by any other known technique; heat sealing, gluing.

The metal-plastic construction objects of step a of the invention are prepared by different known methods. The most commonly used are direct co-extrusion, thermal sealing, and induction gluing. These last two methods are preferably practiced on a continuous line fed with plastic films and metal strips.

Direct co-extrusion consists of extruding between the two metal foils which are unrolled continuously and which constitute the external layers, the central polymer layer on one side and the others of this central layer the two thin layers of adhesive. The composite product thus obtained passes then between the rollers in order to achieve the adherence between the different layers. This technique evidently applies just in the case of thermoplastic adhesives.

Heat bonding consists in starting with a composite strip of polymers including a central layer of polymer coated on each of its faces by the adhesive layer, here also thermoplastic, and of introducing this strip between two metal foils. The heat bonding is assured by the passage of the composite product thus obtained between two rolls heated to a temperature sufficient to melt or at least soften the adhesive layer sufficiently in a fashion to guarantee the adhesion between the polymer core and the metal foils.

Finally, the gluing by induction consists of coating the inside faces of the two metal foils with a thermosetting adhesive by a known method and applying these foils from one side and the other on the strip of central polymer with the aid of rollers.

The forming of the constructions comprises drawing in one or several passes.

For the ends, the forming includes the operations of cutting a circular disc, of drawing, of scoring, of post forming, of rivet formation, and of positioning the ring. The degree of drawing is slight and the drawing process is similar to that applied to steel or aluminum foils. It is shown schematically in FIG. 2 in cross section. The initially flat disc (31) is shown in the process of drawing. It is pressed between a drawing mold die (32) and a pressure plate (33). The descent of the punch (34) driven by a piston allows one to obtain the required end profile.

For the can bodies fabricated in general in two successive drawing passes, the operating conditions ought to be adapted to the particular case of metal-plastic constructions of the MPM type. These adaptations concern the shape of the base of the punch during the two passes and the shape of the die plate during the second plate.

As in the prior art, one starts with a flat circular disc cut from a strip of metal-plastic construction. This disc is first drawn in a first drawing pass for forming an intermediate part in the form of a cup using the apparatus represented in FIG. 1. The initially flat disc (1) appears during deformation. It is pressed between a drawing die plate (2) and a pressure plate (3). The descent of the punch (4) driven by a rod permits the formation of the cup which involves no reduction in the thickness. But the inventors have been led to choose a particular shape of the punch base for assuring a drawing of the complex without the formation of cracks, wrinkles, or delamination.

Figure 5A:
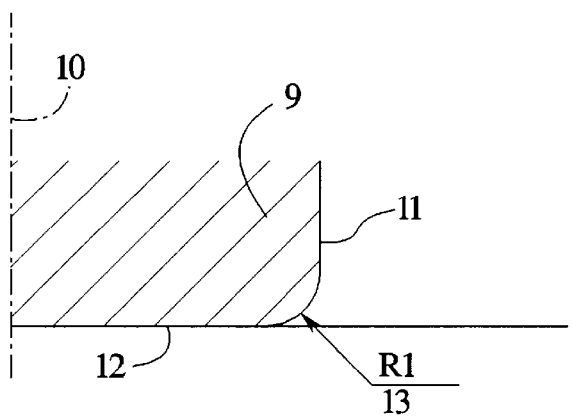
FIGS. 5a and 5b represent two preferred forms of the base of the punch according to the invention.
Figure 5B:
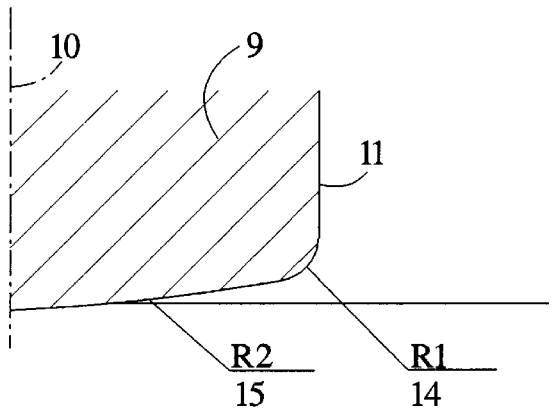

The punch, of a general shape of a cylinder of revolution, presents, according to one of the preferred methods of the invention, an axial section of which the generatrice are connected at the base of the punch by a circular arc of a radius between 5 and 10 mm. This connection can be done directly on the base of the punch or by an intermediary, seen in section of a second circular arc of which the center lies on the axis of revolution of the punch. FIGS. 5a and 5b illustrate the two variations indicated above.

FIG. 5a represents the simplest shape of the embodiment. The punch (9) is viewed in section through the axis; it takes the shape of a cylinder of revolution about the axis (10). The generatrix (11) is connected to the base (12) by a circular arc of radius R1 which falls between 5 and 10 mm (8 mm for example for punch with a diameter of 85 mm). This circular arc generates by revolution a portion of a torus.

FIG. 5b represents a developed shape a little more complicated; the generatrice are joined on the base by a first circular arc (14) of radius R1 between 5 and 10 mm which connects tangentially to a second circular arc of large radius R2 (15) centered on the axis of the punch. The circular arc (15) generates a spherical dome and the circular arc (14) a portion of a torus. By way of example, R1 could be in the order of 6 mm and R2 in the order of 250 mm.

The second drawing pass is represented in FIG. 6. The starting material is no longer a disc but a shape already drawn during the course of the first pass. The cup (24) is in the process of drawing, its initial diameter corresponding to the upper part (25) is in the process of reduction towards its final diameter (26) defined by the space between the punch (27) and the die plate (28). Correspondingly, the height of the walls grows without that there be an ironing in the normal sense of the word, that is a significant reduction of the thickness. An inside pressure plate (29) is positioned at the interior of the starting cup.

The inventors have found that the angle at which the generatrix of the entry cone makes with the horizontal plate perpendicular to the axis of the punch is critical for drawing metal-plastic constructions of type MPM. This angle ought to be between 10 degrees and 70 degrees and preferably around 60 degrees.

The can components, bodies or ends, made by drawing starting from metal-plastic construction of the MPM type are equally part of the invention.

They are characterized in that the metal-plastic construction comprises a central layer of thermoplastic polymer of the thickness P coated on its interior and exterior faces with metal foils of respective thicknesses $M_i$ and $M_e$ such that the ratio $P/(M_i+M_e)$ is greater than 0.5.

This ratio is preferably between 0.7 and 2.5 and most preferably between 1 and 2.

Advantageously, for the can bodies, the thickness P of the polymer is between 100 and 500 microns and the thickness $M_i$ or $M_e$ of each of the metal foils is between 25 and 150 microns; for the ends, the thickness of the polymer is between 80 and 300 microns and the thickness $M_i$ or $M_e$ of each of the metal foils is between 25 and 100 microns.

EXAMPLE 1

A strip of polypropylene of 300 microns thickness has been coated on each of its faces with a layer of 10 microns in thickness of an adhesive consisting of a film of maleic acid modified polypropylene. The two films of adhesive have been applied on the film cold by passing between two rolls. The composite strip thus obtained has been then introduced continuously between two foils of 100 micron thick aluminum alloy 3003, a manganese alloy according to the standards of the "Aluminum Association", each unwound from a bobbin and preheated by passage through an oven at a temperature of 200° C. in a fashion to melt the adhesive. The MPM construction obtained was then passed between the rollers exerting a pressure of around 4000 kPa, then rolled onto a bobbin. Starting from this construction, circular discs of 140 mm in diameter were cut out. These discs have been then drawn in two successive passes with the aid of a punch analogous to that represented in FIG. 5a with R1=8 mm and for the second pass with the aid of a die plate for which the angle alpha was 60°. The first pass has given cups with an outside diameter of 86 mm and a height of 35 mm, the second pass can bodies with an outside diameter of 67 mm and a height of 56 mm. Careful examination of these cups have not shown evidence of any cracks of the metal or of the plastic. No delamination between the metal and the plastic has been observed.

EXAMPLE 2

A composite MPM strip has been prepared by coextruding between two foils of the same 3003 alloy as in Example 1, but of a thickness of 80 microns, a core comprised of polypropylene in 250 microns of thickness and on one side and the others of this core a layer of adhesive comprised of maleic acid modified polypropylene of 10 microns in thickness. The adhesion has been achieved by passage between two rolls heated to 200° C., while applying a pressure of 4000 kPa. Can bodies have been fabricated under the same conditions as in Example 1. The examination of these cans has shown no cracking of the metal or of the plastic. No delamination between the metal and the plastic has been observed.

EXAMPLE 3

An MPM composite strip has been prepared by coextrusion under the same conditions and with the same component as those in Example 2, but in using for the core polypropylene recycled from cans fabricated with this same MPM construction. Even though the recovery of the polypropylene from the used cans did not permit the separation of the adhesive from the polymer, the constructions obtained were of excellent quality and did not show either cracks or delamination. Starting from this complex, circular discs of a diameter of 140 mm have been cut. These discs then have been drawn in two successive passes with the aid of a punch analogous to that represented in FIG. 5b with R1=6 mm and R2=250 mm and a die plate of which the angle alpha was 45°. The first pass gave an intermediate cup of an exterior diameter of 86 mm and a height of 35 mm, the second pass of these intermediate cups gave cans of an exterior diameter of 67 mm and of a height of 56 mm. The examination of these cups has not exhibited any cracks of the metal or of the plastic. No delamination between the metal and the plastic has been observed.

EXAMPLE 4

Under the same operational conditions as those of Example 2, a MPM construction has been fabricated comprising successively: a foil of 3003 alloy of 80 microns in thickness, a layer of adhesive of amorphous polyethylene terephtalate of 10 microns in thickness, a layer of polyethylene terephtalate of 200 microns in thickness, another layer of amorphous polyethylene terephtalate of 10 microns of thickness, finally another foil of 3003 alloy of 80 microns in thickness. Some can forms have been fabricated under the same conditions as in Example 1. The examination of these cans has not shown any cracks of the metal or of the plastic. No delamination between the metal and the plastic has been observed.

EXAMPLE 5

Example 5 concerns the same fabrication of cups as in Example 4, with the comparative difference that the polyethylene terephtalate used came from the recovery of used plastic bottles. These bottles, after washing and drying, have been ground and have been introduced in the feed hopper of the extruder. No quality problem has been observed either on the construction or on the cups obtained by drawing.

We claim:

1. A finished can body comprising an upstanding sidewall obtained by drawing a metal-polymer-metal structure $M_i$-P-$M_e$, wherein P is an essentially non-oriented thermoplastic polymer layer and $M_i$ and $M_e$ are interior and exterior metal foil layers, respectively, said sidewall having an upper rolled region wherein the sidewall is rolled outwardly such that the $M_i$ layer is in extension and is ruptured at a location where a radius of curvature of the rolled region is smallest.

2. A finished can body according to claim 1, wherein the metal foil $M_e$ is thicker than the metal foil $M_i$.

3. A method of making a drawn can body comprising the steps of:
   a) preparing a strip having a metal-polymer-metal structure $M_i$-P-$M_e$, wherein P is an essentially non-oriented thermoplastic polymer layer and $M_i$ and $M_e$ are each metal foil layers and wherein a ratio of relative thicknesses before drawing and ironing of $P/(M_i+M_e)$, is greater than about 0.5;
   b) cutting a disc from the strip; and
   c) drawing the disc to form a can body in one or more successive passes.

4. A method for making a drawn can body according to claim 3, characterized in that the ratio $P/(M_i+M_e)$ is between 0.7 and 2.5.

5. A method for making a drawn can body according to claim 3, characterized in that the drawing is done in two or more passes.

6. A method for making a drawn can body according to claim 3, characterized in that an adhesive layer of thickness between 1 and 20 microns is interposed between the central polymer layer and the foils of metal, the adhesive thickness being included in the total thickness of polymer P.

7. A method for making a drawn can body according to claim 3, characterized in that the thermoplastic polymer layer P is selected from the group consisting of polypropylene, high density polyethylene, low density polyethylene, polyesters, and polyamides.

8. A method for making a drawn can body according to claim 6, characterized in that the adhesive is a thermosetting polymer selected from the group consisting of polyurethane and epoxy resins.

9. A method of making a drawn can body according to claim 6, characterized in that the adhesive is a thermoplastic polymer selected from the group consisting of ethylenic acid-modified polypropylene, an ethylene-acrylic acid copolymer, a polyester and copolymers of any of the foregoing thermoplastic polymers.

10. A method for making a drawn can body according to claim 3, wherein the metal of the metal foil layers is selected from the group consisting of steel, chrome plated steel, tin plated steel, aluminum, and aluminum alloys.

11. A method for making a drawn can body according to claim 10 wherein the metallic foil layer $M_i$ is thicker than metallic foil layer $M_e$.

12. A method for making a drawn can body according to claim 3, wherein said disc is drawn in a first pass with a cylindrical punch having a circular base with generatrices blended on the base by a radius of curvature of from about 5 to about 10 mm and thereafter is drawn in a second pass with a punch and die plate which define an entry cone in which the angle of entry of the die and the horizontal is from about 10 to about 70°.

13. A method for making a drawn can body according to claim 12, wherein a circular arc linking generatrices of the punch to the base merges on a second circular arc centered on an axis of the punch.

14. A method for making a drawn can end comprising the steps of:
   a) preparing a strip having a metal-polymer-metal structure $M_i$-P-$M_e$, wherein P is an essentially non-oriented thermoplastic polymer layer and $M_i$ and $M_e$ are each metal foil layers and wherein a ratio of relative thicknesses of $P/(M_I+M_e)$, is greater than about 0.5;

b) cutting a disc from the strip; and c) drawing the disc to form a can end in a single pass.

15. A method for making a drawn can end according to claim 14, characterized in that the ratio $P/(M_I+M_e)$ is between 1.0 and 2.

16. A method for making a drawn can end, easy open or not, according to claim 14, characterized in that the central polymer layer has a thickness of from about 80 to about 300 microns and each of the metal foils has a thickness of from about 25 to about 100 microns.

17. A method for making a drawn can end, easy open or not, according to claim 14, characterized in that an adhesive layer of thickness from about 1 to about 10 microns is interposed between the central polymer layer and the foils of metal, the adhesive thickness being included in the total thickness of polymer P.

18. A method for making a drawn can body comprising the steps of:

a) preparing a strip having a metal-polymer-metal structure $M_I$-P-$M_e$, wherein P is an essentially non-oriented thermoplastic polymer layer having a thickness of from about 100 to about 500 microns and $M_I$ and $M_e$ are each metal foil layers each having a thickness of from about 25 to about 150 microns and wherein a ratio of relative thicknesses of $P/(M_I+M_e)$, is greater than about 0.5;

b) cutting a disc from the strip; and c) drawing the disc to form a can body in one or more successive passes.

* * * * *